Patented Oct. 25, 1938

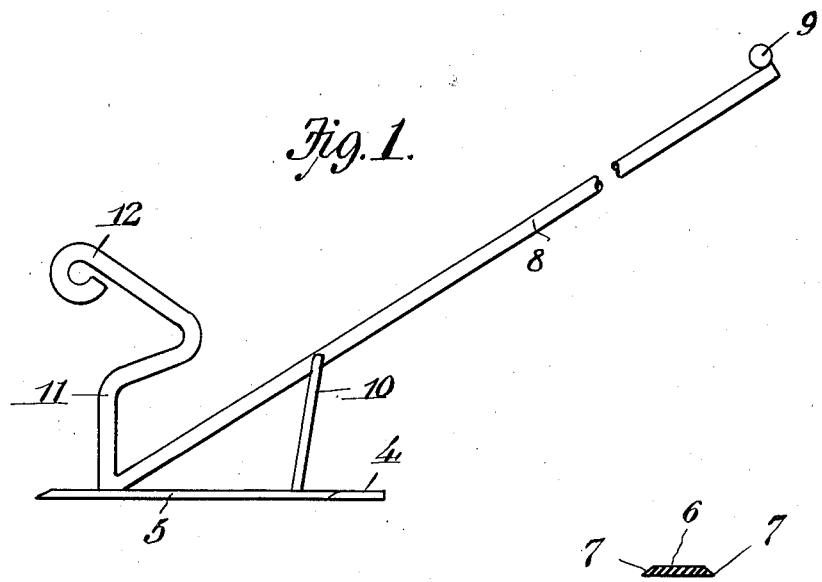
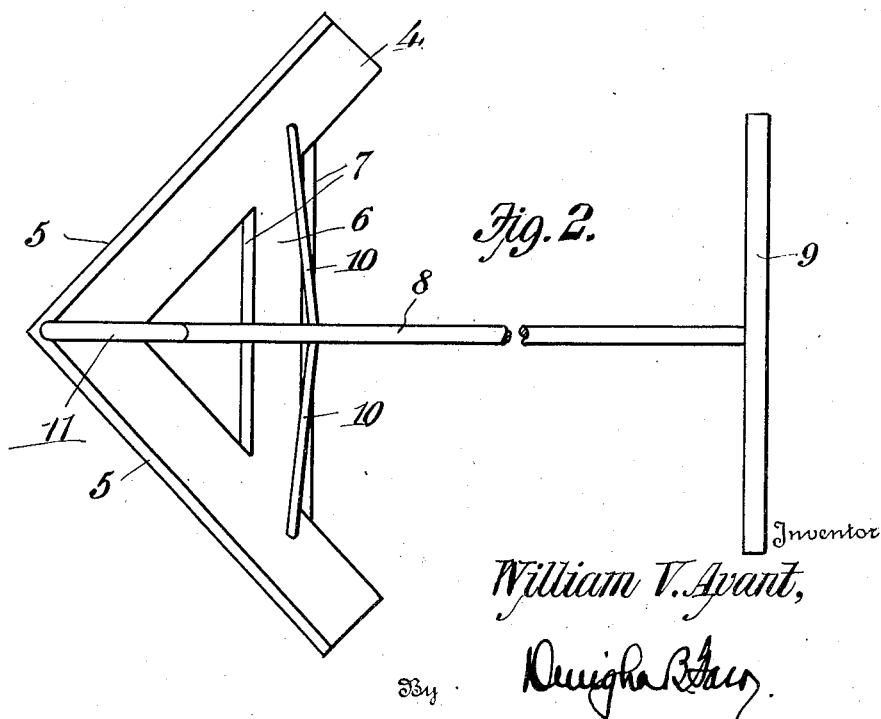

2,134,070

UNITED STATES PATENT OFFICE 2,134,070

WEEDING TOOL

William V. Avant, South Miami, Fla.

Application October 27, 1937, Serial No. 171,337

1 Claim. (Cl. 30—314)

This invention relates generally to tools, and particularly to a plow for use in cleaning weeds and grass from sand traps of golf courses.

The primary object of the invention is to provide a tool in the form of a flat plow of extremely light weight and easy manipulation, which may be readily and easily operated to properly treat the turf and lawn by removing therefrom weeds, grass and other objectionable matter.

A further object of the invention is to provide a tool of the character thus generally described which is of simple construction, which is of light weight, which may be manufactured at exceedingly low cost, which will prove both durable in use and highly practical and efficient in operation.

With these objects in view, together with others which will appear as the description proceeds, the invention consists in the novel construction, combination and arrangement of parts, all as will be described more fully hereinafter, illustrated in the drawing and particularly pointed out in the claim.

In the drawing:

Figure 1 is a side elevation, parts broken away, of a golf course tool embodying the invention, Figure 2 is a top plan view of the tool, and Figure 3 is a transverse sectional view taken through one of the cutting blades of the tool.

In maintaining golf greens in proper condition for play, it is desirable that there be provided a light but strong and easily operated tool for maintaining the turf or greens in proper condition and without the expenditure of a great amount of time. In fulfilling this need it is essential that the tool be rigid and durable so as to withstand strains and stresses to which it may be subjected when in use, and yet one which may be manufactured and sold at low cost. The tool of my invention is aimed at the achievement of these results.

In the drawing, the operative part or body of the tool is indicated at 4, and comprises a flat plate of steel preferably of triangular form and which is adapted to lie flat upon the ground. The main cutting blades are indicated at 5, the edges of which are beveled or sharpened so as to provide divergent cutting blades. These blades may be of any desired length, but are preferably rather restricted in order that the entire tool may be of light weight and thus readily manipulated. The rear portions of the divergent blades are connected by a cross blade 6 having forward and rear cutting edges indicated at 7. The cross blade is preferably formed integral with the divergent blades and has its cutting edges disposed preferably at right angles to the direction of movement of the tool when in operation.

The body has affixed thereto, preferably by welding, a shaft 8 which rises from the fore part of the body and extends rearwardly to a height for convenient operation from the rear of the body. This shaft is provided at its upper end with a cross bar 9 serving to provide hand grips for the tool. This shaft is secured to the body midway the lateral extremities of the latter, in order that the tool may be properly balanced, and arms 10 connect the rear parts of the body with the shaft for the purpose of stabilizing or lending rigidity to the structure. These arms connect the blades with the shaft at such point as to maintain the blades rigid and against flexing.

The tool is provided at its fore part with a post 11 having a forwardly extending portion providing an eye or opening 12 in which may be engaged a strap or rope by which the implement may be pulled or drawn forwardly along the ground when desired.

In treating the turf to rid the same of weeds or other growth, the handles 9 are gripped and the body is given alternate forward and rearward sliding movements upon the surface. The angular cutting edges 5 sever the weeds and other growth as the tool is advanced, this severance being aided by the forward cutting edge 7 of the cross piece 6 disposed substantially at right angles to the direction of movement of the tool. When the tool is retracted, the rear cutting edge 7 of the cross blade 6 tends to cut any weeds or growth which may have escaped the cutting edges in the advance movement of the tool. The stabilizing arms 10 connect the body with this shaft at such point as to maintain the blades of the body against any possibility of flexing, thus enhancing the effectiveness of the tool in the cutting operation.

In instances where heavy or obstinate growth may be encountered, a strap or rope 12 tied in the eye of the draw bar enables a second operator to pull the tool forwardly while it is steered by the following operator holding the handles 9 at the rear end of the shaft.

It will thus be seen that I have provided a tool in the form of a surface plow sufficiently capable of performing the purposes for which it is intended, and one wherein the possibility or opportunity for breakage or derangement is materially minimized.

Having thus described my invention, what I claim as new and useful is:

A tool comprising a flat plate in the shape of a hollow triangle, a shaft rigidly secured to said plate near the apex thereof and extending upwardly and rearwardly from and in the median line of said plate, arms rigidly connected upon opposite sides of said shaft immediately above the base of said triangle, said arms extending outwardly and downwardly from said shaft and rigidly connected at their outer ends to said plate near the rear extremities thereof and in alinement with the base of said triangle, the forward part of said shaft extending upwardly and forwardly from said plate, and the outer edges of the sides of said triangle and both edges of said base being beveled downwardly to provide cutting edges.

WILLIAM V. AVANT.